United States Patent
Dazai

(10) Patent No.: US 8,958,920 B2
(45) Date of Patent: Feb. 17, 2015

(54) AIR CONDITIONING CONTROLLING DEVICE AND METHOD

(75) Inventor: Ryouta Dazai, Tokyo (JP)

(73) Assignee: Azbil Corporation, Tokyo (JP)

( * ) Notice: Subject to any disclaimer, the term of this patent is extended or adjusted under 35 U.S.C. 154(b) by 505 days.

(21) Appl. No.: 13/356,709

(22) Filed: Jan. 24, 2012

(65) Prior Publication Data

US 2012/0192955 A1 Aug. 2, 2012

(30) Foreign Application Priority Data

Jan. 28, 2011 (JP) .................................. 2011-016251

(51) Int. Cl.
G06F 19/00 (2011.01)
F24F 3/044 (2006.01)
F24F 11/00 (2006.01)

(52) U.S. Cl.
CPC ............. *F24F 3/044* (2013.01); *F24F 11/0012* (2013.01); *F24F 11/008* (2013.01); *Y02B 30/767* (2013.01)
USPC ................................. 700/276; 137/2; 454/229

(58) Field of Classification Search
USPC ........ 700/276, 277, 278, 295, 296, 62; 137/2; 236/19.3; 454/229, 236, 256
See application file for complete search history.

(56) References Cited

U.S. PATENT DOCUMENTS

| | | | | | |
|---|---|---|---|---|---|
| 4,353,409 | A | * | 10/1982 | Saunders et al. ............... | 165/240 |
| 4,540,118 | A | * | 9/1985 | Lortie et al. ................... | 236/44 C |
| 5,461,877 | A | * | 10/1995 | Shaw et al. ..................... | 62/185 |
| 5,976,010 | A | * | 11/1999 | Reese et al. .................... | 454/229 |
| 6,161,764 | A | * | 12/2000 | Jatnieks ......................... | 236/49.3 |
| 6,698,219 | B2 | * | 3/2004 | Sekhar et al. ................... | 62/179 |
| 6,826,454 | B2 | * | 11/2004 | Sulfstede ....................... | 700/276 |
| 2003/0146289 | A1 | * | 8/2003 | Sekhar et al. ................. | 236/49.3 |

(Continued)

FOREIGN PATENT DOCUMENTS

| | | |
|---|---|---|
| JP | H02-195144 | 8/1990 |
| JP | H08-28940 A | 2/1996 |
| JP | H08-061757 | 3/1996 |

(Continued)

OTHER PUBLICATIONS

Wang et al., Model-based optimal control of VAV air-conditioning system using genetic algorithm, The Hong Kong Polytechnic Universtiy, p. 471-487, 2000.*

(Continued)

*Primary Examiner* — Kidest Bahta
(74) *Attorney, Agent, or Firm* — Troutman Sanders LLP

(57) ABSTRACT

An air conditioning controller includes a supply air temperature controller controlling a temperature of supply air provided to an air conditioner so a supply air temperature measurement value matches a supply air temperature setting value; a total air volume device measuring/calculating a total supply air volume value that is the total of the air volumes to each individual variable air volume unit; a supply air volume controller controlling an air volume of supply air to the air conditioner, depending on the total air volume value; an air volume insufficiency evaluator evaluating if the air volume is insufficient by comparing the total air volume value to a total air volume lower limit value; and a supply air temperature setter changing the supply air temperature setting value in a direction that the variable air volume unit increase the air volume, when there is an evaluation that the air volume is insufficient.

10 Claims, 8 Drawing Sheets

(56) References Cited

U.S. PATENT DOCUMENTS

2008/0067473 A1* 3/2008 Walker et al. ............ 252/301.16
2010/0017045 A1* 1/2010 Nesler et al. .................. 700/296

FOREIGN PATENT DOCUMENTS

JP 2010-079378 A 4/2010
JP 2010-079381 A 4/2010

OTHER PUBLICATIONS

Korean Office Action, dated Mar. 21, 2013, which issued during the prosecution of Korean Patent Application No. 10-2011-0142159, which corresponds to the present application.

Japanese Office Action dated Apr. 22, 2014, from corresponding Japanese Application No. 2011-016251.

* cited by examiner

AIR CONDITIONING CONTROLLING DEVICE AND METHOD

CROSS REFERENCE TO RELATED APPLICATIONS

The present application claims priority under 35 U.S.C, §119 to Japanese Patent Application No. 2011-016251, filed Jan. 28, 2011, which is incorporated herein by reference.

FIELD OF TECHNOLOGY

The present invention relates to an air conditioning system, and, in particular, relates to an air conditioning controlling device and method in an air conditioning system provided with a plurality of variable air volume units.

BACKGROUND

Conventionally, air conditioning control of controlled spaces wherein a plurality of variable air volume (VAV) units is disposed is performed through calculating the air volume to be blown by each individual VAV unit based on a load. Moreover, a supply rating (for example, 4000 CMH) and a minimum outside air volume (for example, 1000 CMH) are established in advance for the air conditioner, and a maximum air volume (for example, 1000 CMH) and a minimum air volume (for example, 200 CMH) are established for the individual VAV unit. There is the constraint of the minimum required volume on the total of the air volumes blown into the controlled space due to the need for air exchange in order to maintain the environment of the controlled area. The minimum air volume for each VAV unit in the controlled area is set to a quantitative value that is larger than zero, in order to ensure the minimum value for the total air volume.

FIG. 5 is a diagram illustrating an example of a minimum air volume setting in a conventional air conditioning system. The air conditioning system illustrated in FIG. 5 has an air conditioner 1; a cold water valve 2 for controlling the volume of cold water to the air conditioner 1; a hot water valve 3 for controlling the volume of hot water to the air conditioner 1; a supply duct 7 for supplying supply air from the air conditioner 1 to a controlled space 9; VAV units 8-1 through 8-4 for controlling, for individual controlled areas Z1 through Z4, the volumes of supply air supplied into the controlled space 9; VAV control units 11-1 through 11-4, which are control devices for controlling the VAV units 8-1 through 8-4; temperature sensors 12-1 through 12-4, for measuring, for each controlled area Z1 through the Z4, the room temperature of the controlled space 9; an outside air damper 13 for adjusting the volume of outside air that is drawn into the air conditioner 1, and a temperature sensor 14 for measuring the temperature of the supply air. The air conditioner 1 is structured from a cooling coil 4, a heating coil 5, and a supply air fan 6. 10-1 through 10-4 in FIG. 5 are blower openings for the supply air.

In the example in FIG. 5, the air volume of the VAV unit 8-1 for the controlled area Z1 is 900 CMH, the air volume for the VAV unit 8-2 for the controlled area Z2 is 700 CMH, and the air volumes for the VAV units 8-3 and 8-4 for the controlled areas Z3 and the Z4 are each 200 CMH. That is, because the air conditioning load is low for the controlled areas Z3 and Z4, the air volumes for the VAV units 8-3 and 8-4 are set to be small air volumes. In this way, when the air volumes of the VAV units 8-3 and 8-4 are set to the minimum air volumes, it is not possible to reduce the air volumes further, and thus there are constraints on the controllable temperature range, leading to the possibility that the room temperature will become too low in the case of a cooling operation, or the room temperature may become too high in the case of a heating operation.

Given this, technologies have been proposed for improving the limitations on control through constraining, through the minimum air volume setting values, the air volumes for the individual controlled areas while maintaining the total air volumes to values that are no less than a total air volume minimum value (See Japanese Unexamined Patent Application Publication 2010-79378 ("JP '378") and Japanese Unexamined Patent Application Publication 2010-79381 ("JP '381")). The technologies disclosed in JP '378 and JP '381 determine the air volume for each individual VAV unit so that the total of the air volumes of all of the individual controlled areas will be no less than a total air volume lower limit value when the total of the required air volumes (operating quantities) for the individual controlled areas is less than the total air volume lower limit value.

FIG. 6 is a diagram illustrating the minimum air volume settings based on the technologies disclosed in JP '378 and JP '381. In the example in FIG. 6, the air volume of the VAV unit 8-1 for the controlled area Z1 is 900 CMH, the air volume for the VAV unit 8-2 for the controlled area Z2 is 700 CMH, the air volume for the VAV unit 8-3 for the controlled area Z3 is 50 CMH, and the air volume for the VAV unit 8-4 for the controlled area Z4 is 100 CMH. Consequently, the total air volume is 900 CMH+700 CMH+50 CMH+100 CMH=1750 CMH.

In this way, in the example in FIG. 6, the total air volume will be a value that is no less than the 100 CMH of the total air volume lower limit value, and the minimum air volume setting values of the VAV units 8-3 and 8-4 for the controlled areas Z3 and Z4 are reduced in accordance with the loads of the controlled areas Z3 and Z4, making it possible to relax the minimum air volume setting value control, and to resolve the problem of the room temperature becoming too low during a cooling operation or the room temperature becoming too high during a heating operation. Moreover, in the example in FIG. 6, it is possible to reduce the energy consumption when compared to the example in FIG. 5, by reducing the total air volume.

In the conventional technology, when the total air volume falls below the total air volume lower limit value because a VAV unit is stopped or because the air conditioning load has decreased, there is the potential for problems such as the following to arise due to handling by increasing the minimum air volume setting values. FIG. 7 and FIG. 8 are diagrams for explaining the conventional problem areas. In the example in FIG. 7, the air volume of the VAV unit 8-1 for the controlled area Z1 is 750 CMH, the air volume for the VAV unit 8-2 for the controlled area Z2 is 100 CMH, and the air volumes for the VAV units 8-3 and 8-4 for the controlled areas Z3 and the Z4 are each 0 CMH. Among these, the air volume for the VAV unit 8-3 for the controlled area Z3 goes to 0 CMH because there is no air conditioning load, and the air volume for the VAV unit 8-4 for the controlled area Z4 goes to 0 CMH because the control has been terminated. The total air volume is 750 CMH+100 CMH+0 CMH+0 CMH=850 CMH, falling below the total air volume lower limit value of 1000 CMH.

In the conventional technology, when a situation as illustrated in FIG. 7 occurs, the handling is to increase the lower limit air volume setting values, as illustrated in FIG. 8, in order to maintain the total air volume as a whole. In the example in FIG. 8, the minimum air volume setting values for the VAV units 8-2 and 8-3 for the controlled areas Z2 and Z3 are set to 1125 CMH. As a result, the total air volume goes to 750 CMH+125 CMH+125 CMH+0 CMH=1000 CMH. In this way, the conventional technology is able to maintain the total air volume at a value that is no less than the total air volume minimum value.

However, notwithstanding the fact that the load for the controlled area Z2 is small, still the air volume is increased from 100 CMH to 125 CMH, and notwithstanding the fact that there is no load for the controlled area Z3, the air volume is increased from 0 CMH to 125 CMH, and thus an air volume that is greater than that which is necessary is provided, and there is the possibility that the room temperature will become too low during cooling operations and the room temperature will become too high during heating operations. Note that a similar problem occurs also when there is insufficient outside air.

What is needed is to solve the problem areas set forth above, and the object thereof is to provide an air conditioning controlling device and method able to improve the ability to control the temperature within the room while, at the same time, increasing the total air volume to a value that is no less than the total air volume lower limit value when the air volume is insufficient.

SUMMARY

An example of a solution is an air conditioning controlling device in an air conditioning system having a plurality of variable air volume units for controlling, depending on a load status of a controlled area, a plurality of air volumes of supply air provided to a plurality of controlled areas from an air conditioner, including supply air temperature controlling means for controlling a temperature of supply air provided by the air conditioner so that a supply air temperature measurement value will match a supply air temperature setting value; air volume insufficiency evaluating means for evaluating whether or not an air volume is insufficient relative to a required air volume for maintaining the environment of a controlled area; and supply air temperature setting means for changing the supply air temperature setting value, in a direction where in the variable air volume unit will increase the air volume, when the air volume insufficiency evaluating means have evaluated the air volume to be insufficient. Additionally, one example of a configuration of an air conditioning controlling device according to the present invention further has total air volume deriving means for measuring or calculating a total air volume value that is the sum of the air volumes supplied to each individual variable air volume unit; and total air volume controlling means for controlling an air volume of supply air provided by the air conditioner, in accordance with the total air volume value; wherein: the air volume insufficiency evaluating means evaluate whether or not the air volume is insufficient by comparing the total air volume value to a total air volume lower limit value that has been set in advance. Additionally, one example of a configuration of an air conditioning controlling device according to the present invention further comprises: $CO_2$ controlling means for controlling an outside air introduction volume to the air conditioner so that the $CO_2$ concentrations in a plurality of control areas will match a $CO_2$ concentration setting value that has been set in advance; wherein the air volume insufficiency evaluating means evaluate whether or not the air volume is insufficient by evaluating whether or not the outside air is insufficient. Additionally, one example of a configuration of an air conditioning controlling device according to the present invention further comprises: $CO_2$ controlling means for controlling an outside air introduction volume to the air conditioner so that the $CO_2$ concentrations in a plurality of control areas will match a $CO_2$ concentration setting value that has been set in advance; wherein the air volume insufficiency evaluating means, along with evaluating whether or not the total air volume is insufficient by comparing the total air volume value with the total air volume lower limit value, also evaluate whether or not the outside air is insufficient, and evaluates the air volume as insufficient if the total air volume is insufficient and/or the outside air is insufficient.

The present invention is an air conditioning controlling method in an air conditioning system including a plurality of variable air volume units for controlling, depending on a load status of a controlled area, a plurality of air volumes of supply air provided to a plurality of controlled areas from an air conditioner, having a supply air temperature controlling step for controlling a temperature of supply air provided by the air conditioner so that a supply air temperature measurement value will match a supply air temperature setting value; an air volume insufficiency evaluating step for evaluating whether or not an air volume is insufficient relative to a required air volume for maintaining the environment of a controlled area; and a supply air temperature setting step for changing the supply air temperature setting value, in a direction where in the variable air volume unit will increase the air volume, when the air volume is evaluated to be insufficient.

In the present examples, whether or not the air volume is insufficient is evaluated, and if the evaluation is that the air volume is insufficient, the supply air temperature setting value is changed in the direction wherein the variable air volume unit will increase the air volume, and thus each of the variable air volume units that is in operation will increase its air volume in accordance with the state of the load in the respective corresponding controlled area. Given the present examples, the room temperature measurement value does not change despite the increase in air volume, and thus the room temperature does not become too tow during a cooling operation and does not become too high during a heating operation. Consequently, the present example makes it possible to increase the total air volume so as to be no lower than the total air volume minimum value when the total air volume is insufficient, thus making it possible to improve the ability to control the room temperature.

DETAILED DESCRIPTION

In the present examples, if the total of the air volumes for the individual VAV units falls below the minimum required total air volume lower limit value for the controlled space, or if the outside air introduced by the air conditioner is insufficient, the supply air temperature setting value is changed to increase the air volumes of the individual VAV units. As a result, the present example is able to avoid the problem of supplying air volumes that are greater than what is required for a controlled area wherein there is no need to increase the air volume.

Figure 1:
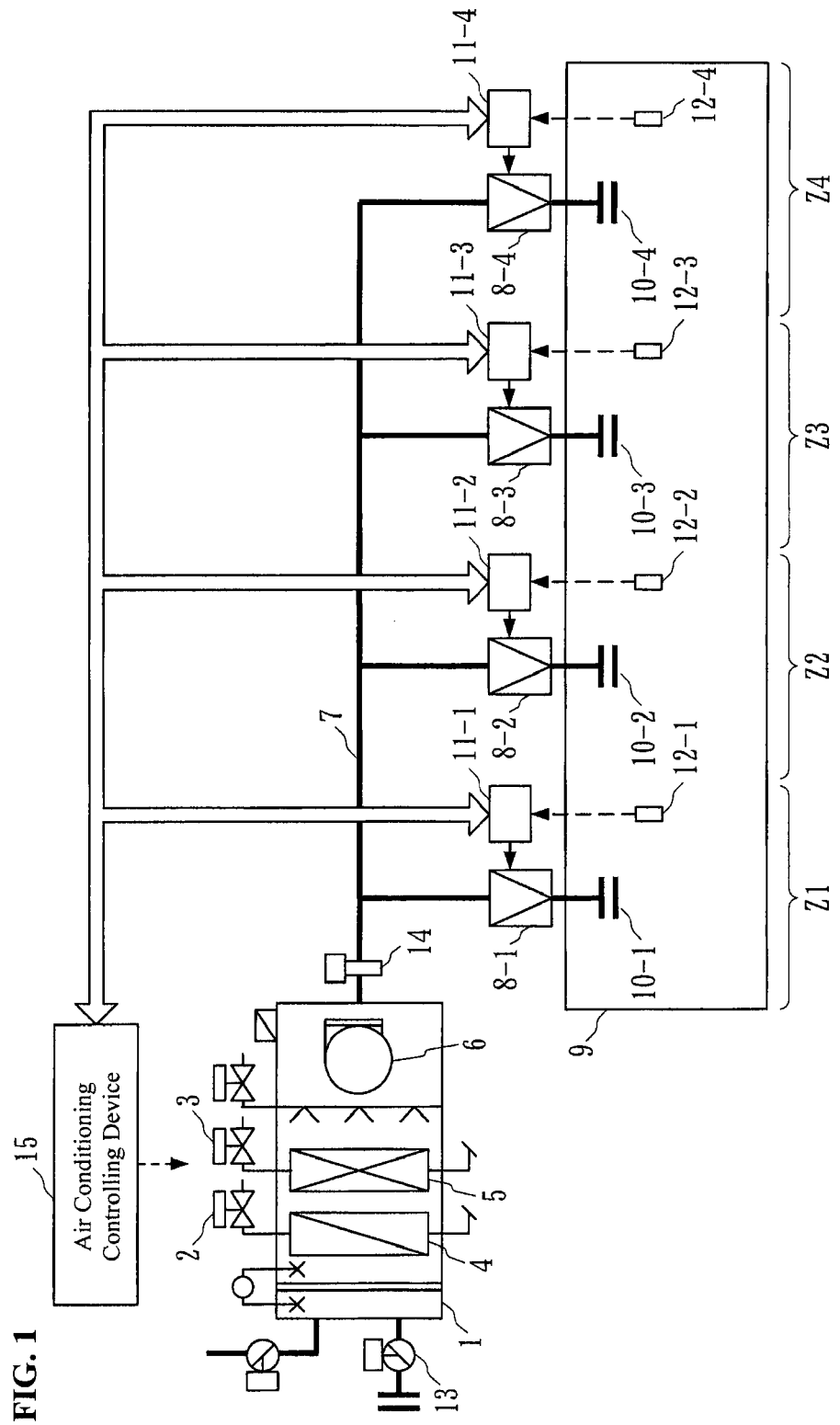
FIG. 1 is a block diagram illustrating a configuration of an air conditioning system according to an example.

Forms for carrying out the present invention will be explained below in reference to the figures. FIG. 1 is a block diagram illustrating a configuration of an air conditioning system according to an example. The air conditioning system in the present example includes an air conditioner 1; a cold water valve 2; a hot water valve 3; a supply air duct 7; VAV units 8-1 through 8-4; VAV control units 11-1 through 11-4; temperature sensors 12-1 through 12-4; an outside air damper 13; a temperature sensor 14; and an air conditioning controlling, device 15.

The air conditioner 1 is structured from a cooling coil 4, a heating coil 5, and a supply air fan 6. The VAV units 8-1 through 8-4 and the VAV control units 11-1 through 11-4 are disposed in the individual controlled areas Z1 through Z4 in a controlled space 9. Dampers, not illustrated, are provided within the VAV units 8-1 through 8-4, enabling control of the volumes of supply air that pass through the VAV units 8-1 through 8-4. 10-1 through 10-4 in FIG. 1 are blower openings for the supply air.

Within the air conditioner 1, the speed of rotation of the supply air fan 6 and the degrees of opening of the cold water valve 2 and the hot water valve 3 are controlled by the air conditioning controlling device 15. The air conditioning controlling device 15 calculates an operating quantity through, for example, a PID calculation, based on the discrepancies between the supply air temperature setting value and the supply air temperature measurement value that is measured by the temperature sensor 14, and outputs the operating quantity to the cold water valve 2 and the hot water valve 3 to control the degrees of opening thereof, in the case of a cooling operation, the opening of the cold water valve 2 is determined in accordance with the operating quantity, to thereby control the volume of cold water that is supplied to the cooling coil 4 of the air conditioner 1. On the other hand, in the case of a heating operation, the opening of the hot water valve 3 is determined in accordance with the operating quantity, to thereby control the volume of hot water that is supplied to the heating coil 5 of the air conditioner 1. That is, the air conditioning controlling device 15, at the time of a cooling operation by the air conditioner 1, sets the degree of opening of the hot water valve 3 to 0% and controls the degree of opening of the cold water valve 2 so that the supply air temperature measured value will match the supply air temperature setting value. Moreover, the air conditioning controlling device 15, at the time of a heating operation by the air conditioner 1, sets the degree of opening of the cold water valve 2 to 0% and controls the degree of opening of the cold water valve 3 so that the supply air temperature measured value will match the supply air temperature setting value.

The air that is cooled by the cooling coil 4 or the air that is heated by the heating coil 5 is blown out by the supply air fan 6. The air (supply air) that is expelled by the supply air fan 6 is provided through the supply air duct 7 to the VAV units 8-1 through 8-4 for the individual controlled areas Z1 through Z4, to be supplied into the individual controlled areas Z1 through Z4 through the VAV units 8-1 through 8-4.

The VAV control units 11-1 through 11-4 calculate the required air volumes for the individual controlled areas Z1 through Z4 through, for example, PID calculations, based on the discrepancies between the room temperature measurement values, measured by the temperature sensors 12-1 through 12-4, of the individual controlled areas Z1 through Z4 and the room temperature setting values, and send the required air volume values to the air conditioning controlling device 15, while, on the other hand, controlling the opening of the dampers (not shown) of the VAV units 8-1 through 8-4 so as to ensure the required air volume. Note that minimum air volume setting values are set in each of the VAV control units 11-1 through 11-4 by the air conditioning controlling device 15. The VAV control units 11-1 through 11-4 use the minimum air volume setting values as the required air volume values when the calculated required air volume values fall below the minimum air volume setting values. In the present form of embodiment, the minimum air volume setting value is set to 0 CMH.

The air conditioning controlling device 15 calculates the total air volume value for the system as a whole from the measured air volume values sent from the individual VAV control units 11-1 through 11-4, and calculates the speed of rotation of the supply air fan in accordance with the total air volume value, and controls the air conditioner 1 so as to produce the calculated speed of rotation of the supply air fan. The operation set forth above is the same as in the conventional air conditioning system.

Figure 2:
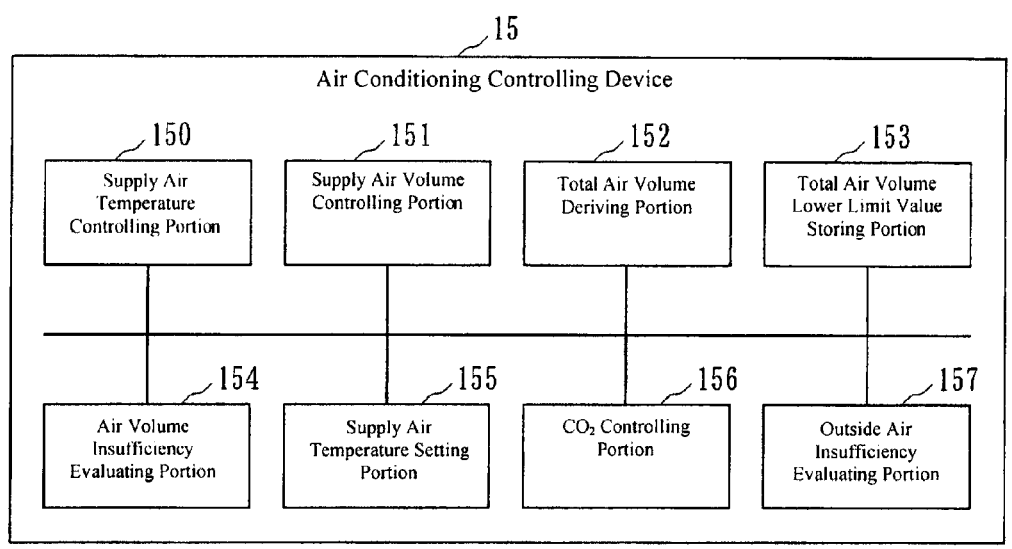
FIG. 2 is a block diagram illustrating a configuration of an air conditioning controlling device for the air conditioning system according to the example.

The distinctive characteristics of the present example is explained next. FIG. 2 is a block diagram illustrating a configuration of an air conditioning controlling device 15. The air conditioning controlling device 15 has a supply air temperature controlling portion 150; a supply air volume controlling portion 151; a total air volume driving portion 152; a total air volume lower limit value storing portion 153; an air volume insufficiency evaluating portion 154; a supply air temperature setting portion 155; a $CO_2$ controlling portion 156; and an outside air insufficiency evaluating portion 157.

The supply air temperature controlling portion 150 controls the temperature of the supply air that is provided by the air conditioner 1, through controlling the degrees of opening of the cold water valve 2 and the hot water valve 3 of the air conditioner 1. The supply air volume controlling portion 151 controls the air volume of the supply air provided by the air conditioner 1 through controlling the speed of rotation of the supply air fan of the air conditioner 1. The total air volume deriving portion 152 calculates the total air volume value that is the sum of the measured air volume values sent from the individual VAV control units 11-1 through 11-4.

Note that although in the present example the total air volume value is calculated after receiving the measured air volume values, measured by each of the VAV units 8-1 through 8-4, through the individual VAV control units 11-1 through 11-4, instead the total air volume value itself may be measured. This measurement may be accomplished through the provision of an air volume sensor in the main duct of the supply air duct 7 (at the position where the temperature sensor 14 is provided). Moreover, the total air volume deriving portion 152 may calculate the total air volume value from an output value of an inverter that regulates the speed of rotation of the fan in the air conditioner 1. In this case, the total air volume value can be calculated through multiplying the air conditioner rated air volume value by the inverter output value (%). Moreover, the total air volume deriving portion 152 may calculate the sum of the required air volume values, sent from the individual VAV control units 11-1 through 11-4, as the total air volume value. The total air volume lower limit value storing portion 153 stores in advance a total air volume lower limit value that expresses the total air volume that is the lower limit requirement for the controlled space 9, determined from the room pressure, the air exchange volume, and the like.

The air volume insufficiency evaluating portion 154 evaluates whether or not the air volume is insufficient, by comparing the total air volume value, measured or calculated by the total air volume deriving portion 152, to the total air volume lower limit value that is stored in the total air volume lower limit value storing portion 153. The supply air temperature setting portion 155, when it is evaluated that the air volume is insufficient, changes the supply air temperature setting value in the direction that causes the individual VAV control units 11-1 through 11-4 to increase the air volumes.

The $CO_2$ controlling portion 156 calculates an operating quantity, using, for example, a PID calculation, based on the discrepancy between a specific $CO_2$ concentration setting value and a $CO_2$ concentration measurement value for the controlled space 9, measured by a $CO_2$ sensor, not shown, and controls the degree of opening of a damper by outputting an operating quantity to the outside air damper 13. In this way, the outside air introduction volume is controlled to cause the $CO_2$ concentration of the controlled space 9 to match a $CO_2$ concentration setting value that has been set in advance. The outside air insufficiency evaluating portion 157 evaluates whether or not the outside air is insufficient.

Figure 3:
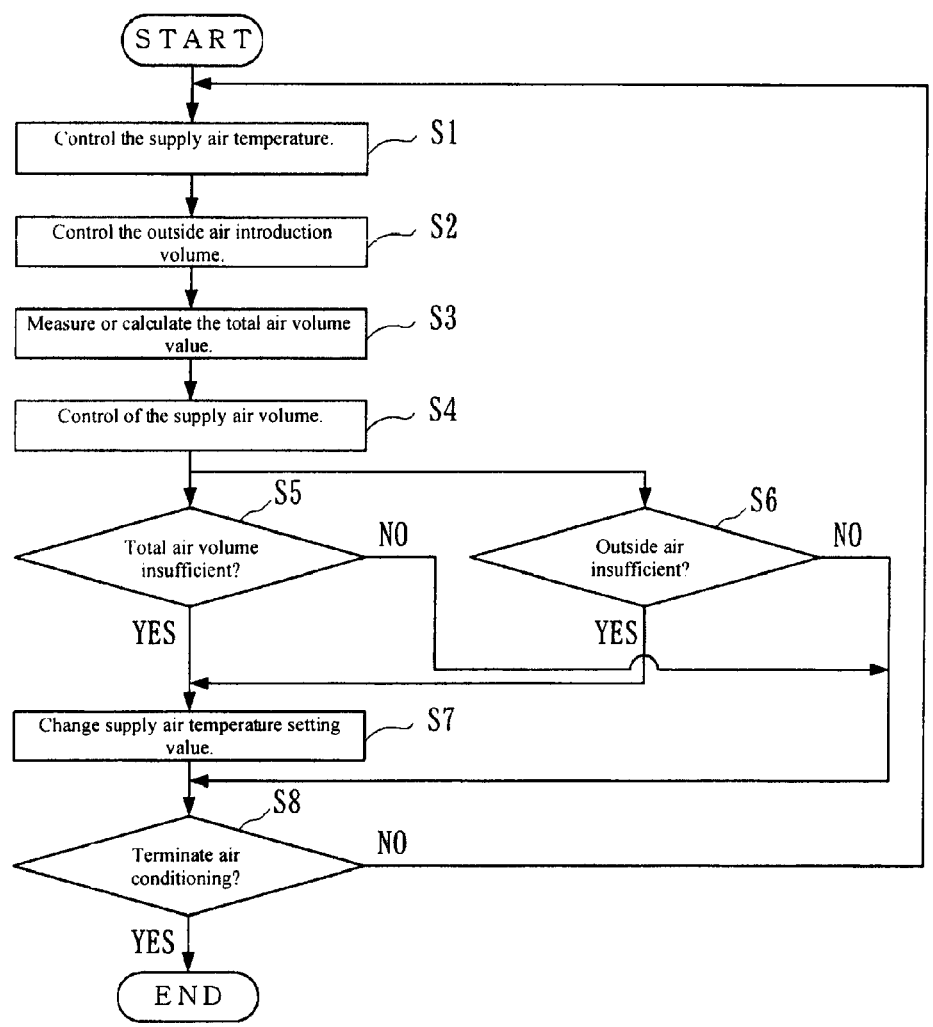
FIG. 3 is a flowchart illustrating the operation of the air conditioning controlling device of the air conditioning system according to the example.

The operation of the air conditioning controlling device 15 according to the present example is explained next using FIG. 3. The supply air temperature controlling portion 150 controls the degrees of opening of the cold water valve 2 and the hot water valve 3 of the air conditioner 1, as described above (Step S1 in FIG. 3). The $CO_2$ controlling portion 156 controls the outside air introduction volume as described above (Step S2).

The total air volume deriving portion 152 measures or calculates the total air volume value (Step S3). The supply air volume controlling portion 151 controls the air volume of the supply air that is provided by the air conditioner 1 through controlling the speed of rotation of the supply air fan of the air conditioner 1 in accordance with the total air volume value, as described above (Step S4).

The supply air insufficiency evaluating portion 154 evaluates whether or not the total air volume is insufficient, by comparing the total air volume value that is measured or calculated by the total air volume deriving portion 152 to the total air volume lower limit value stored in the total air volume tower limit value storing portion 153 (Step S5). If the total air volume value is less than the total air volume lower limit value, then the air volume insufficiency evaluating portion 154 evaluates that the total air volume is insufficient.

On the other hand, the outside air insufficiency evaluating portion 157 evaluates whether or not the outside air is insufficient (Step S6). Whether or not the outside air is insufficient is evaluated as described below. First the outside air insufficiency evaluating portion 157 evaluates whether or not the $CO_2$ control output is at a maximum, that is, whether or not the operating quantity calculated by the $CO_2$ controlling portion 156 is at the maximum value of 100%. Moreover, the outside air insufficiency evaluating portion 157 evaluates whether or not the supply air volume controlling output, calculated by the supply air volume controlling portion 151, is no more than a specific value (for example, 70%). If the $CO_2$ control output is at the maximum and the supply air volume controlling output is no more than the specific value, then the outside air insufficiency evaluating portion 157 evaluates that the outside air is insufficient. If the total air volume is insufficient and/or the outside air is insufficient, then the evaluation is that the air volume is insufficient.

If the total air volume is insufficient and/or the outside air is insufficient, then the supply air temperature setting portion 155 changes the supply air temperature setting value by a specific amount (for example, 2° C.) in the direction that will cause the individual VAV control units 11-2 through 11-4 to increase the air volume (Step S7). If the air-conditioner 1 is blowing cold air, of a temperature that is lower than the room temperature, then this direction in which the VAV control units 11-1 through 11-4 will increase the air volume refers to the direction in which the supply air temperature setting value will increase. Moreover, if the air-conditioner 1 is blowing hot air, of a temperature that is higher than the room temperature, then this direction in which the VAV control units 11-1 through 11-4 will increase the air volume refers to the direction in which the supply air temperature setting value will decrease. Whether to blow cold or blow hot may be evaluated through comparing the supply air temperature with a weighted average value of the room temperature measurement values for each of the controlled areas Z1 through the Z4, weighted by the air volumes of the corresponding VAV units 8-1 through 8-4, for example, or may be evaluated through using the temperature of the return air that is returned to the air conditioner 1 from the controlled space 9 as the room temperature, and comparing that room temperature to the supply air temperature. The air conditioning controlling device 15 performs the processes in Step S1 through S7, as described above, at regular intervals until the air conditioning control is terminated (YES in FIG. 3: Step S8).

In Step S7, if the supply air temperature setting portion 155 changes the supply air setting value, then each of the VAV control units 11-1 through 11-4 operate so as to increase the air volume. For example, if the air-conditioner 1 is blowing cold air, then when the supply air temperature setting value is increased, then the supply air temperature is increased by the control of the cold water valve by the supply air temperature controlling portion 150, resulting in an increase in the room temperature measurement value, and thus each individual VAV control unit 11-1 through 11-4 increases the air volumes of the VAV units 8-1 through 8-4, to control the room temperature measurement values to match the room temperature setting values. Moreover, if the air-conditioner 1 is blowing hot air, then when the supply air temperature setting value is decreased, then the supply air temperature is decreased by the control of the hot water valve by the supply air temperature controlling portion 150, resulting in a decrease in the room temperature measurement value, and thus each individual VAV control unit 11-1 through 11-4 increases the air volumes of the VAV units 8-1 through 8-4, to control the room temperature measurement values to match the room temperature setting values.

Each VAV control unit 11-1 through 11-4 increasing the air volume increases the total air volume value that is measured or calculated by the total air volume deriving portion 152 (Step S3). The supply air volume controlling portion 151 increases the total air volume in accordance with the increase in the total air volume value (Step S4). In this way, the supply air temperature setting value is changed repetitively until the total air volume value is no longer less than the total air volume lower limit value.

Figure 4:
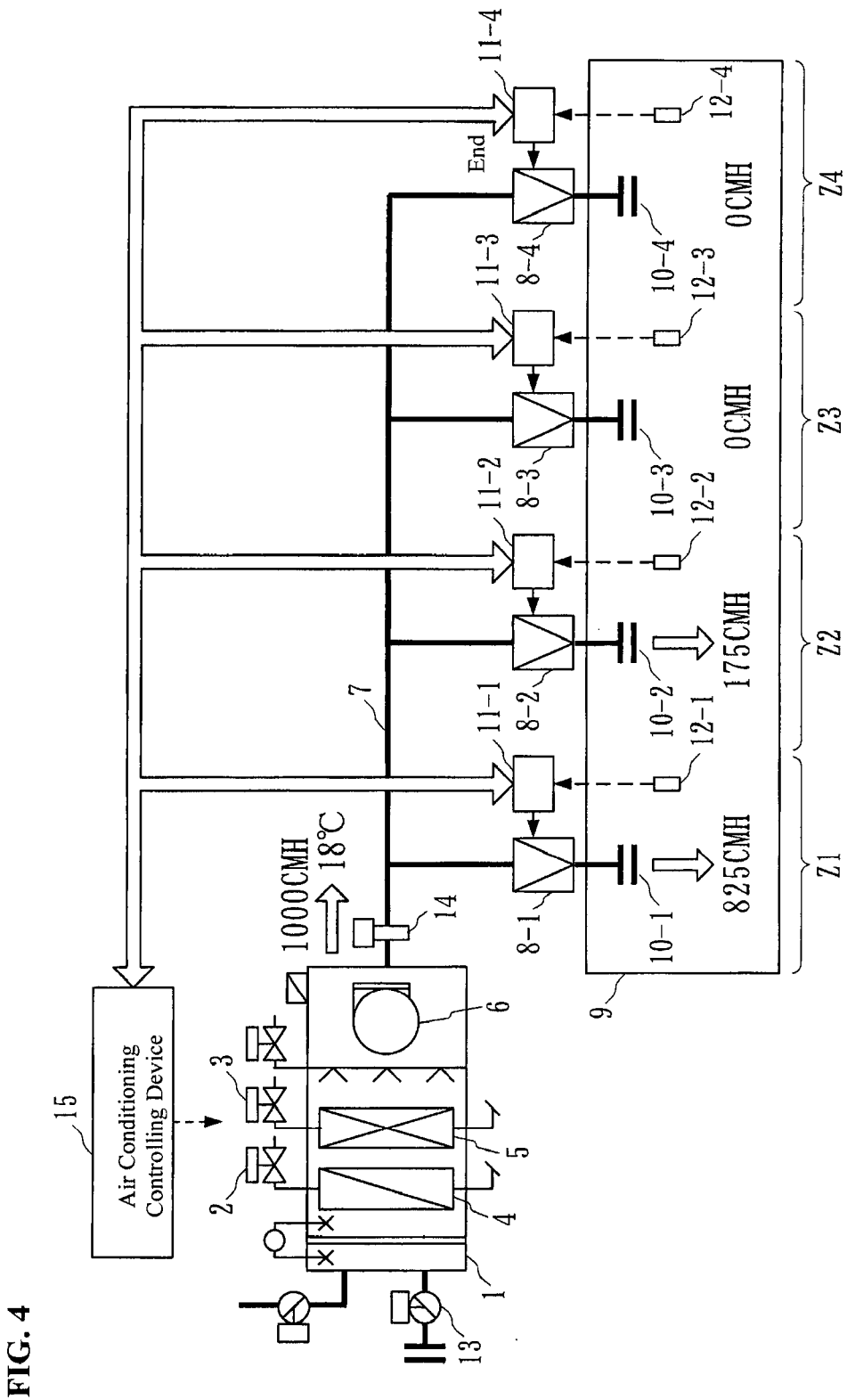
FIG. 4 is a diagram for explaining the effects of the air conditioning system according to the example.
Figure 5:
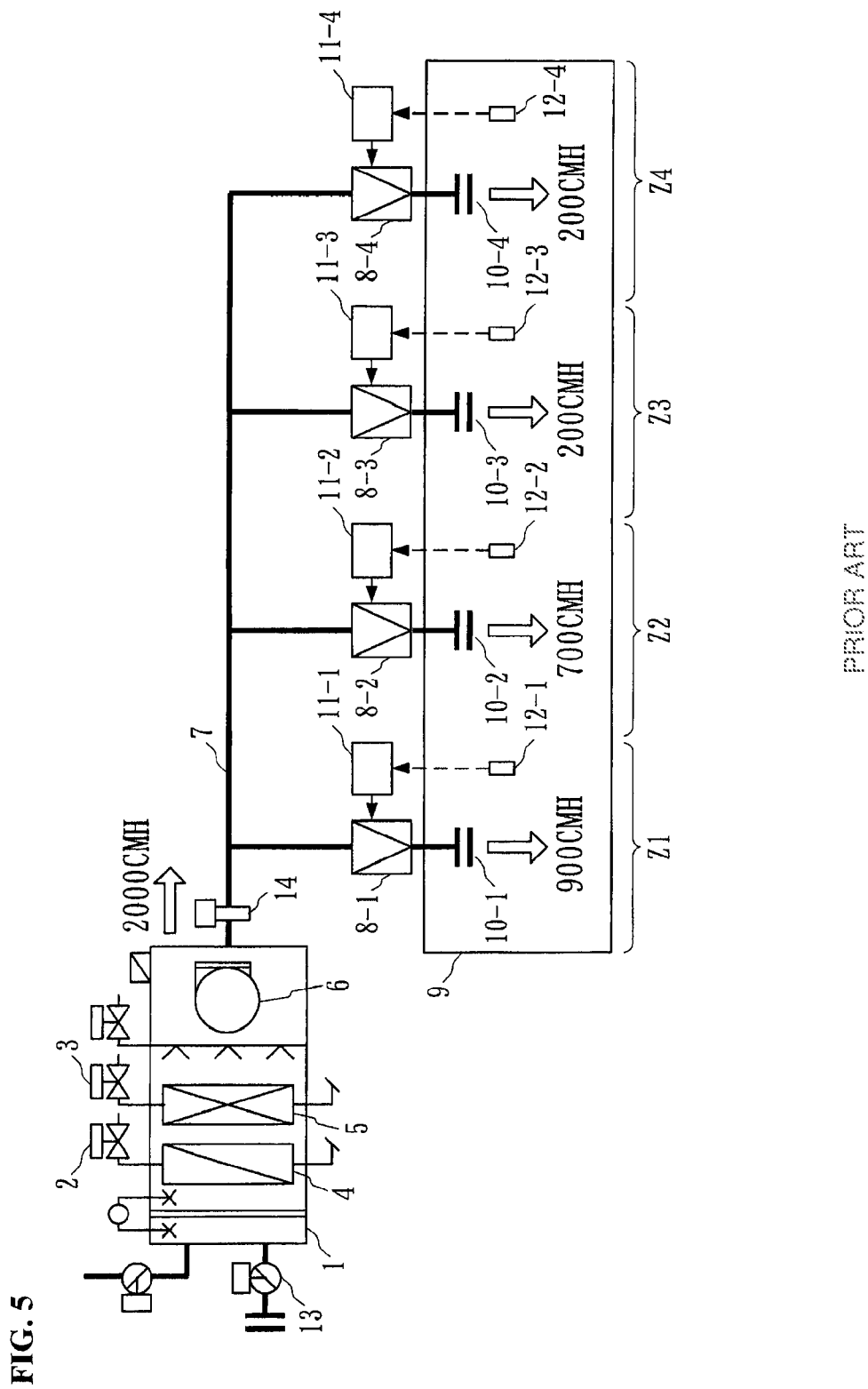
FIG. 5 is a diagram illustrating an example of a minimum air volume setting in a conventional air conditioning system.
Figure 6:
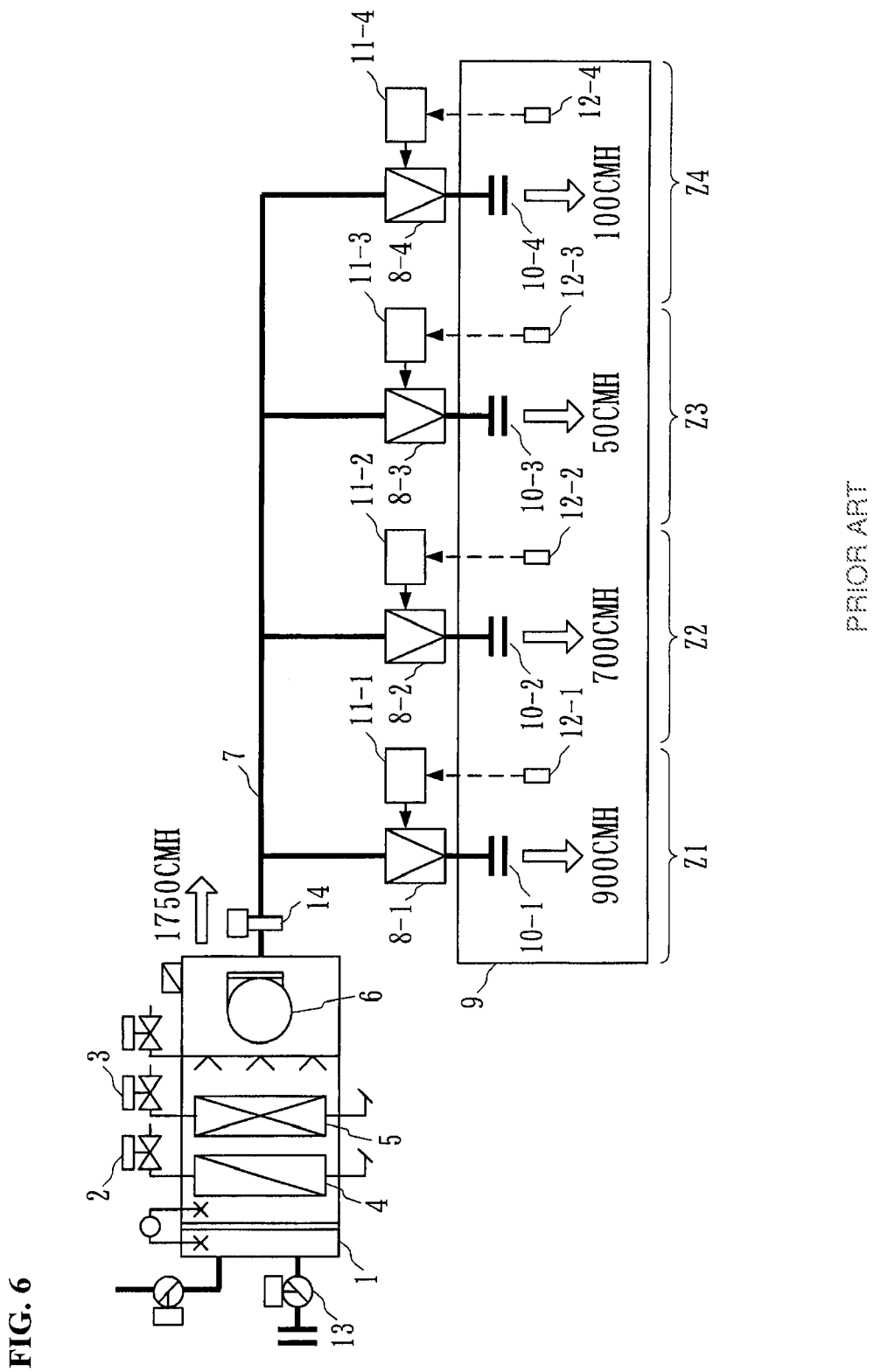
FIG. 6 is a diagram illustrating another example of a minimum air volume setting in a conventional air conditioning system.
Figure 7:
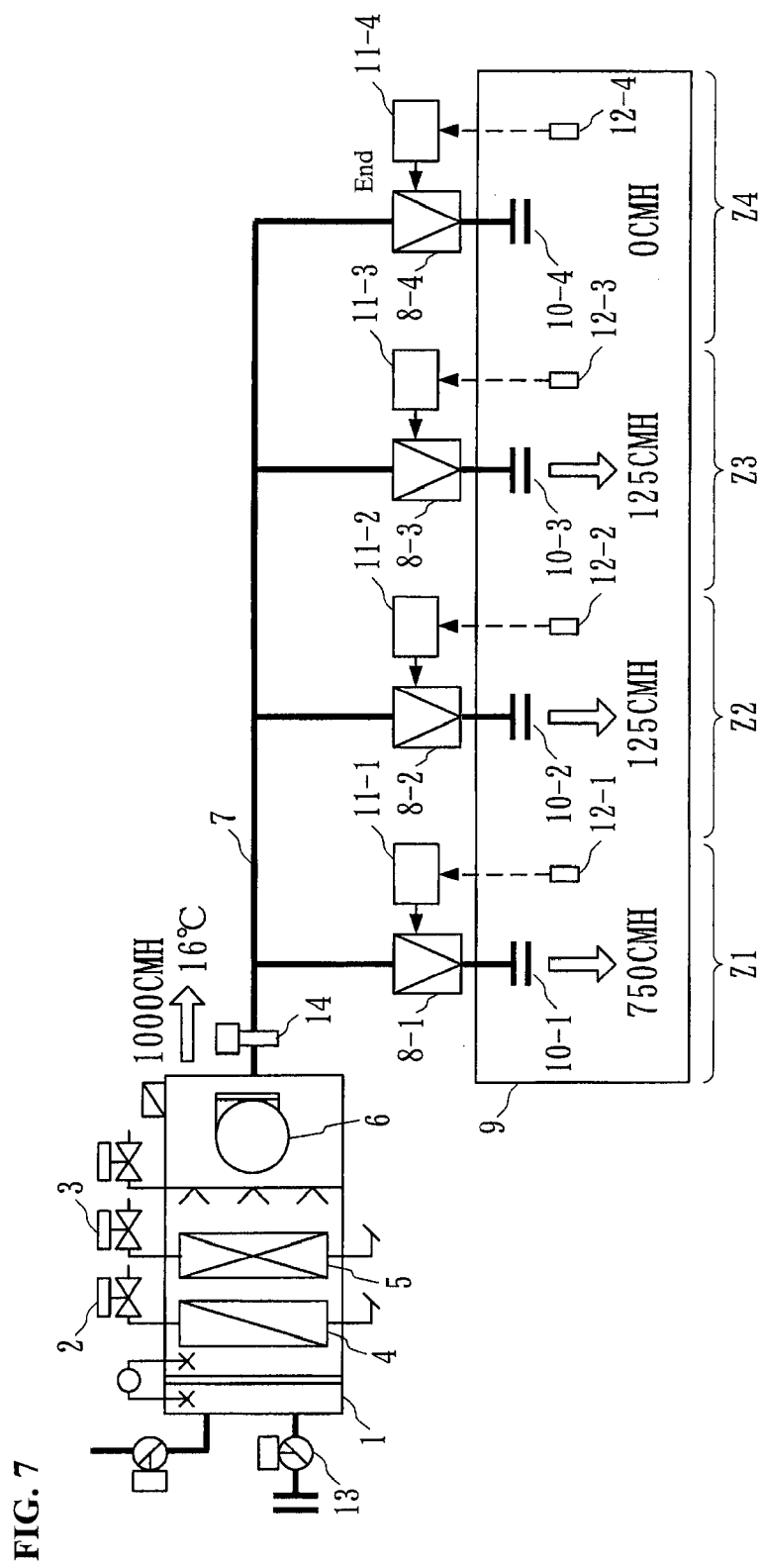
FIG. 7 is a diagram for explaining the problem areas in the conventional air conditioning system.
Figure 8:
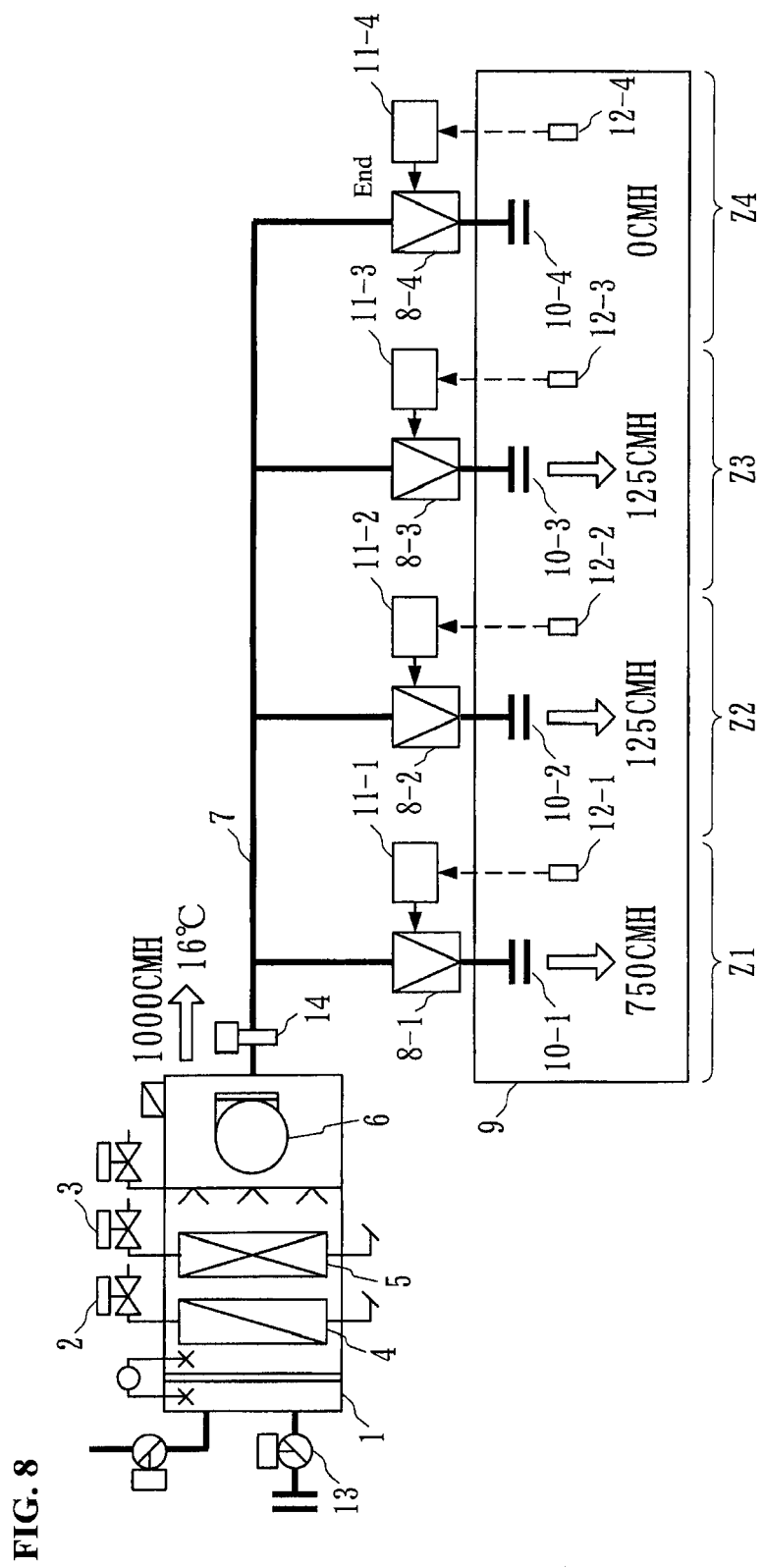
FIG. 8 is a diagram for explaining the problem areas in the conventional air conditioning system.

FIG. 4 is a diagram for explaining the effect of the present example. Note that the example in FIG. 4 illustrates a case wherein the air conditioner 1 is performing a cooling operation. As shown in FIG. 7, when the total air volume value has fallen below the total air volume lower limit value of 1000 CMH, or when the outside air is insufficient, the supply air temperature setting portion 155 increases the supply air temperature setting value. As a result, each individual VAV control unit 11-1 through 11-4 increases the air volume of the VAV units 8-1 through 8-4. In the example in FIG. 7 and FIG. 4, the air volume for the VAV unit 8-3 of the controlled area Z3 is 0 CMH because there is no air conditioning load, and the air volume of the VAV unit 8-4 of the controlled area Z4 is 0 CMH because the control has been terminated. Given this, the VAV control units 11-1 and 11-2 increase the air volumes for those VAV units 8-1 and 8-2 for which it is necessary to have the air blowing.

The result is that the air volume for the VAV unit 8-1 changes from 750 CMH to 825 CMH, and the air volume for the VAV unit 8-2 changes from 100 CMH to 175 CMH. At this time, the total air volume is 825 CMH+175 CMH+0 CMH+0 CMH=1000 CMH, so the total air volume has increased to a value that matches the air volume lower limit value of 1000 CMH. While the air volume increases for the controlled areas Z1 and Z2, there is no change in the room temperature measurement value, and thus in the case of a cooling operation the room temperature does not become too low and, in the case of a heating operation, the room temperature does not become too high.

As noted above, if in the present example, the total air volume is insufficient and/or the outside air is insufficient, then the VAV control units 11-1 through 11-4 change the supply air temperature setting values in the direction that causes an increase in the air volumes, and thus the VAV control units 11-1 through 11-4 cause an increase in the air volumes depending on the load states of the respective corresponding controlled areas. Consequently, the present example makes it possible to increase the total air volume to be no less than the total air volume lower limit value when the total air volume is insufficient or the outside air is insufficient, and enables an improvement in the controllability of the room temperature, and can reduce insofar as is possible, a worsening of the room environment such as being too cold or too hot.

Note that if the air volume is not insufficient and the outside air is also not insufficient, then the supply air temperature setting portion 155, through the normal VAV supply air temperature optimal setting control (load reset control), or the like, determines the optimal value for the supply air temperature setting value.

Additionally, in the present example the supply air temperature setting portion 1155 may change the supply air temperature setting value by only a specific amount (for example, 2° C.) in the direction wherein the individual VAV control units 11-1 through 11-4 reduce the air volumes if the total air volume value has gone above a specific total air volume upper limit value. If the air-conditioner 1 is blowing cold air, of a temperature that is lower than the room temperature, then this direction in which the VAV control units 11-1 through 11-4 decrease the air volume refers to the direction in which the supply air temperature setting value decreases. Moreover, if the air-conditioner 1 is blowing hot air, of a temperature that is higher than the room temperature, then this direction in which the VAV control units 11-1 through 11-4 decrease the air volume refers to the direction in which the supply air temperature setting value increases. Additionally, in the present example, the change is by only a specific amount each time there is a change to the supply air temperature setting value, but instead the scope of change of the supply air temperature setting value may be calculated through logic, such as a PID.

The $CO_2$ controlling portion 156 and the outside air insufficiency evaluating portion 157 are not absolutely critical structural elements. In an air conditioning system wherein $CO_2$ control has not been implemented, the processes in Step S2 and S6 in FIG. 3 are not performed, and thus the supply air temperature setting portion 155 may change the supply air temperature setting value when the total air volume is insufficient (Step S7). Moreover, the air volume may be evaluated as being insufficient if the outside air is insufficient by performing only the outside air insufficiency evaluating process of Step S6, without performing the total air volume insufficiency evaluating process of Step S5 in FIG. 3, to change the supply air temperature setting value.

Each individual VAV control unit 11-1 through 11-4 and air conditioning controlling device 15 in the present example may be embodied as a computer provided with a CPU, a storage device, and an interface with the outside, and as a program for controlling these hardware resources. The CPU of each device executes the processes described in the present example in accordance with a program that is stored in the storage device.

The present example can be applied to air conditioning systems provided with an air conditioner and a plurality of variable air volume units.

The invention claimed is:

1. An air conditioning controlling device in an air conditioning system comprising a plurality of variable air volume units for controlling, depending on a load status of a controlled area, a plurality of air volumes of supply air provided to a plurality of controlled areas from an air conditioner, the air conditioning controlling device comprising:
   a supply air temperature controller controlling a temperature of supply air provided by the air conditioner so that a supply air temperature measurement value will match a supply air temperature setting value;
   an air volume insufficiency evaluator evaluating whether or not an air volume is insufficient relative to a required air volume based on either a total air volume value, which is a sum of the air volumes supplied to the respective variable air volume units, or a $CO_2$ concentration of a controlled area; and
   a supply air temperature setting device changing the supply air temperature setting value in a direction wherein the variable air volume unit increases the air volume, when the air volume insufficiency evaluator has evaluated the air volume to be insufficient, wherein:
   when the air conditioner is blowing cold air with a temperature lower than a room temperature of the controlled area, the direction in which the variable air volume unit increases the air volume is a direction in which the supply air temperature setting value increases; and
   when the air conditioner is blowing hot air with a temperature higher than the room temperature of the controlled area, the direction in which the variable air volume unit increases the air volume is a direction in which the supply air temperature setting value decreases.

2. The air conditioning controlling device as set forth in claim 1, further comprising:
   a total air volume deriving device either measuring or calculating the total air volume value; and
   a supply air volume controller controlling the air volume of supply air provided by the air conditioner in accordance with the total air volume value; wherein:
   the air volume insufficiency evaluator evaluates whether the air volume is insufficient by comparing the total air volume value to a total air volume lower limit value that has been set in advance.

3. The air conditioning controlling device as set forth in claim 1, further comprising:
   a $CO_2$ controller controlling an outside air introduction volume to the air conditioner so that the $CO_2$ concentrations in the plurality of the control areas match a $CO_2$ concentration setting value that has been set in advance; wherein the air volume insufficiency evaluator evaluates whether or not the air volume is insufficient by evaluating whether an outside air is insufficient.

4. The air conditioning controlling device as set forth in claim 2, further comprising:

a $CO_2$ controller controlling an outside air introduction volume to the air conditioner so that the $CO_2$ concentrations in the plurality of the control areas match a $CO_2$ concentration setting value that has been set in advance; wherein the air volume insufficiency evaluator, along with evaluating whether or not the total air volume is insufficient by comparing the total air volume value with the total air volume lower limit value, also evaluates whether or not an outside air is insufficient, and evaluates the air volume as insufficient when either the total air volume is insufficient or the outside air is insufficient.

5. An air conditioning controlling method in an air conditioning system comprising a plurality of variable air volume units for controlling, depending on a load status of a controlled area, a plurality of air volumes of supply air provided to a plurality of controlled areas from an air conditioner, the air conditioning controlling method comprising:

a supply air temperature controlling step controlling, by a supply air temperature controller, a temperature of supply air provided by the air conditioner so that a supply air temperature measurement value matches a supply air temperature setting value;

an air volume insufficiency evaluating step evaluating, an air volume insufficiency evaluator, whether an air volume is insufficient relative to a required air volume based on either a total air volume value, which is a sum of the air volumes supplied to the respective variable air volume units, or a $CO_2$ concentration of a controlled area; and a supply air temperature setting step changing the supply air temperature setting value in a direction wherein the variable air volume unit increases the air volume, when the air volume is evaluated to be insufficient, wherein:

when the air-conditioner is blowing cold air with a temperature lower than a room temperature of the controlled area, the direction in which the variable air volume unit increases the air volume is a direction in which the supply air temperature setting value increases; and when the air-conditioner is blowing hot air with a temperature higher than the room temperature of the controlled area, the direction in which the variable air volume unit increases the air volume is a direction in which the supply air temperature setting value decreases.

6. The air conditioning controlling method as set forth in claim 5, further comprising:

a total air volume deriving step either measuring or calculating, by a total air volume deriving device, the total air volume value; and a supply air volume controlling step controlling, by a supply air volume controller, the air volume of supply air provided by the air conditioner in accordance with the total air volume value; wherein:

the air volume insufficiency evaluating step evaluates whether the air volume is insufficient by comparing the total air volume value to a total air volume lower limit value that has been set in advance.

7. The air conditioning controlling method as set forth in claim 5, further comprising:

a $CO_2$ controlling step controlling, by a $Co_2$ controller, an outside air introduction volume to the air conditioner so that the $CO_2$ concentrations in the plurality of the control areas match a $CO_2$ concentration setting value that has been set in advance; wherein the air volume insufficiency evaluating step evaluates whether the air volume is insufficient by evaluating whether an outside air is insufficient.

8. The air conditioning controlling method as set forth in claim 6, further comprising:

a $CO_2$ controlling step controlling, by a $Co_2$ controller, an outside air introduction volume to the air conditioner so that the $CO_2$ concentrations in the plurality of the control areas match a $CO_2$ concentration setting value that has been set in advance; wherein, in the air volume insufficiency evaluating step, along with evaluating whether the total air volume is insufficient by comparing the total air volume value with the total air volume lower limit value, the air volume insufficiency evaluator also evaluates whether or not the outside air is insufficient, and evaluates the air volume as insufficient when either the total air volume is insufficient or the outside air is insufficient.

9. The air conditioning controlling device as set forth in claim 1, wherein:

when the air conditioner is blowing the cold air and the supply air temperature setting value is increased, each of the plurality of the variable air volume units increases the air volume to control a measured room temperature value of the controlled area to match a predetermined room temperature setting value; and when the air conditioner is blowing the hot air and the supply air temperature setting value is decreased, each of the plurality of the variable air volume units increases the air volume to control the measured room temperature value of the controlled area to match the predetermined room temperature setting value.

10. The air conditioning controlling method as set forth in claim 5, wherein:

when the air conditioner is blowing the cold air and the supply air temperature setting value is increased, each of the plurality of the variable air volume units increases the air volume to control a measured room temperature value of the controlled area to match a predetermined room temperature setting value; and when the air conditioner is blowing the hot air and the supply air temperature setting value is decreased, each of the plurality of the variable air volume units increases the air volume to control the measured room temperature value of the controlled area to match the predetermined room temperature setting value.

* * * * *